United States Patent [19]

Lingwall

[11] Patent Number: 5,073,788
[45] Date of Patent: Dec. 17, 1991

[54] CAMERA SUPPORT

[76] Inventor: David F. Lingwall, 8850 County Rd. 4, North Brainerd, Minn. 56401

[21] Appl. No.: 549,135

[22] Filed: Jul. 6, 1990

[51] Int. Cl.⁵ .............................................. G03B 29/00
[52] U.S. Cl. ...................................... 354/81; 354/293; 352/243
[58] Field of Search ........................... 354/81, 82, 293; 352/243; 224/908

[56] References Cited

U.S. PATENT DOCUMENTS 2,370,611  2/1945  Du Mais ........................... 354/293 X
4,687,309  8/1987  Breslau .................................. 354/82
4,963,904  10/1990 Lee ....................................... 354/82

Primary Examiner—L. T. Hix
Assistant Examiner—Howard B. Blankenship
Attorney, Agent, or Firm—Jerold M. Forsberg

[57] ABSTRACT

A camera support for a camera is quickly and easily shiftable between a suspended at-rest position and a pointing ready to use position. The camera support includes an elongated camera frame having a shoulder engaging portion, a camera deck, a side plate and a pair of telescoping portions having a hand grip and a trigger release. The camera support is attachable to a user's upper body by a strap arrangement wherein the strap arrangement is fixed relative to the user while the camera support includes provisions to permit it to move relative thereto. The camera support may include a unipod or a tripod which will function as a counter-balance and can be employed for ground engaged stability. The camera support includes a hinge for attachment of the camera and a combination of adjustabilities permitting use of different sizes and shapes of cameras and lenses.

18 Claims, 2 Drawing Sheets 5,073,788

CAMERA SUPPORT

BACKGROUND OF THE INVENTION

The present invention relates generally to an improved camera support, and more specifically to an improved camera support which when attached to a user's body is easily and quickly shiftable from a suspended at-rest position to a pointing ready to use position. Additionally, provision is made for stabilizing the camera support with a ground engaging element when the camera support is attached to the user's body and for supporting the camera at eye level when the camera support is detached from the user.

The advent of automatic focusing type cameras and high resolution and high speed film at relatively inexpensive prices has generated a new wave of interest in photography. Amateurs as well as professionals regularly carry cameras looking for situations which often require that the camera be quickly brought into position and actuated. With enthusiasts emphasizing speed and using cameras in situations which require instantaneous reactions in order to obtain a desired picture, e.g. sportsmen, racing enthusiasts, etc., a need has arisen for a camera support which will permit the user to shift the camera into position to take a picture quickly and accurately and yet accommodate cameras of various sizes and shapes. The instant invention answers the need to react quickly and accurately and yet provides adjustability and a stable support when stability is the primary concern.

There have been various types of camera supports proposed over the years which facilitate the usage of a camera. Everything from a simple strap, which permits the user to carry a camera much like a handbag, to very complex harness and frame arrangements, which leave the user's hands free by positioning the camera directly in front of the user's face, have been options. Examples of some of these options are found in prior art patents which disclose various approaches for the supporting of a camera relative to a user for, not only stabilizing, but positioning the camera such that it may be quickly used. One camera support, depicted in U.S. Pat. No. 2,370,611, shows a support for adjustably moving a camera away from or closer to a user while permitting the camera to be quickly raised from a depending position to a position ready to be actuated. Another camera support, depicted in U.S. Pat. No. 2,603,134, shows a support frame arrangement positioning a camera in front of the user such that it is ready for use at any time. Yet another camera support, depicted in U.S. Pat. No. 2,712,779, shows an elongated element 18 with a handle at one end and an adjustable shoulder pad at the other end for facilitating usage of a camera. U.S. Pat. No. 2,746,369 shows yet another camera support which has a padded portion resting on the user's shoulder and a pair of hand grips for stabilizing and positioning the camera so as to be ready for actuation. Another camera supporting device, shown in U.S. Pat. No. 3,767,095, shows a camera supporting arrangement having a shoulder pad and a hand grip, the arrangement being attached to a user's body by a strap arrangement.

It will soon be clear from the following disclosure that none of these prior art devices are concerned with or teach the concept as taught by the instant invention.

SUMMARY OF THE INVENTION

In accordance with the present invention, an improved camera support is provided which is constructed so that it may be attached to the upper body of a user by a strap arrangement in a manner permitting the camera support, with a camera attached thereto, to be shifted from a suspended at-rest position to a pointing ready to use position quickly and accurately. The strap arrangement is generally fixed relative to the user's shoulder and chest and the camera support includes provisions for permitting the camera support to shift relative to the strap arrangement and the user's clothing without binding.

Additionally, the camera support may include, alternatively, a unipod or a tripod. The unipod or tripod is stored in a hanger and is releasably retained therein by a safety strap. The unipod or tripod functions as a counter-balance when the camera support is moved from the suspended at-rest position to the pointing ready to use position and as a stabilizer for pictures which may require extremely steady positioning of the camera by engagement with the ground. The unipod or tripod is conveniently and easily released from the hanger and lowered into engagement with the ground by simply releasing the safety strap, disengaging the unipod or tripod from the hanger, pivoting the unipod or tripod to a generally vertical orientation, and extending the legs. In certain situations it may be desirable to detach the support from the user's body and use the camera. If this is the case, it will be advantageous to use a tripod rather than a unipod such that the camera support, along with an attached camera, can be supported and positioned in a free standing manner by the tripod at eye level.

Accordingly, it is an object of the present invention to provide a camera support which can be quickly and effectively raised from a suspended at-rest position to a pointing ready to use position.

Another object of this invention is to provide a camera support which will support a camera in a stabilized manner either when attached to or detached from the user's body.

Yet another object of the instant invention is to provide a camera support which will accommodate various sizes and types of cameras and which can be balanced properly with a camera attached thereto.

A further object of this invention is to provide a strap arrangement, having a pad associated therewith, which can be generally fixed relative to the user's body with the camera support being shiftable relative thereto.

Other objects and advantages of the present invention will be apparent and understood from the following detailed description when taken in conjunction with the accompanying drawings.

BRIEF DESCRIPTION OF THE DRAWINGS this invention is described hereinbelow, wherein.

DETAILED DESCRIPTION OF THE PREFERRED EMBODIMENT

Figure 4:
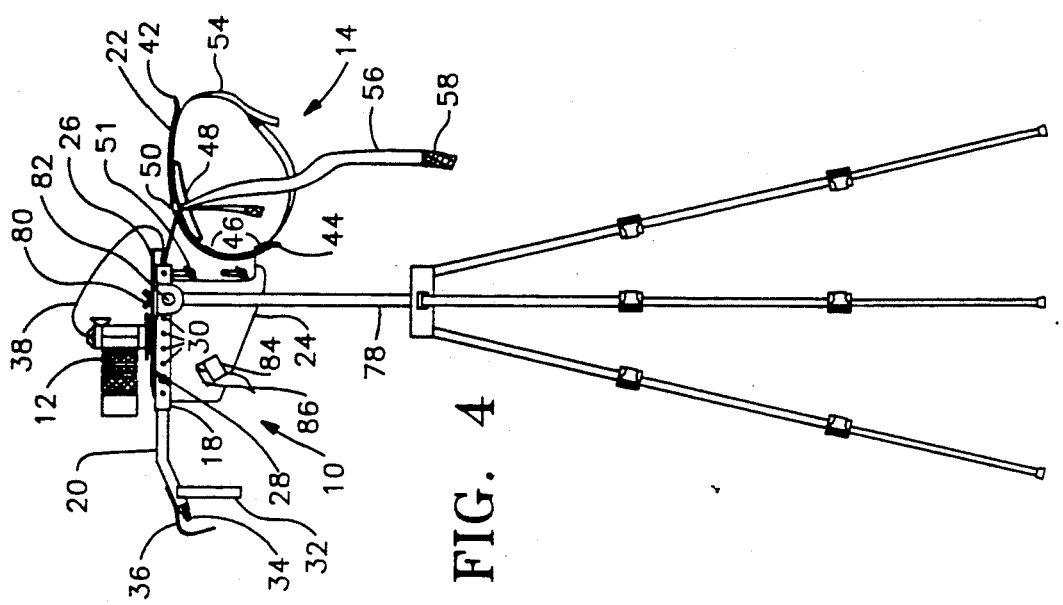
FIG. 4 shows the camera support, with a camera attached thereto, detached from the user and supported by a tripod.

It should be noted that like reference numerals are used throughout the various views to designate similar elements or components.

Referring now to the drawings, a camera support 10, with a camera 12 attached thereto, includes a strap arrangement 14 for attachment of the camera support to the upper body of a user.

As best seen in FIG. 4, camera support 10 includes an elongated frame 16 constructed with first and second telescoping portions 18 and 20, a shoulder engaging portion 22, a side plate 24, and a camera deck 26. Portions 18 and 20 are preferably made from square tube and sized such that first portion 18 is telescopically received within second portion 20. Portion 18 may be fixedly secured relative to side plate 24 so as to extend generally parallel below camera deck 26 and a spring loaded detent (not shown) may be used in cooperation with one of a series of apertures 30 to fix the telescoped portions 18 and 20 relative to one another. Alternatively, portions 18 and 20 can be secured in a telescoped relationship by fasteners 28 cooperating with selected ones of the series of apertures 30. Fasteners 28, as will be discussed later, are used to adjustably secure camera deck 26 to side plate 24. Portion 20 includes a bend along the length thereof such that a distal end thereof extends downwardly at an angle between 20 and 30 degrees.

Figure 2:
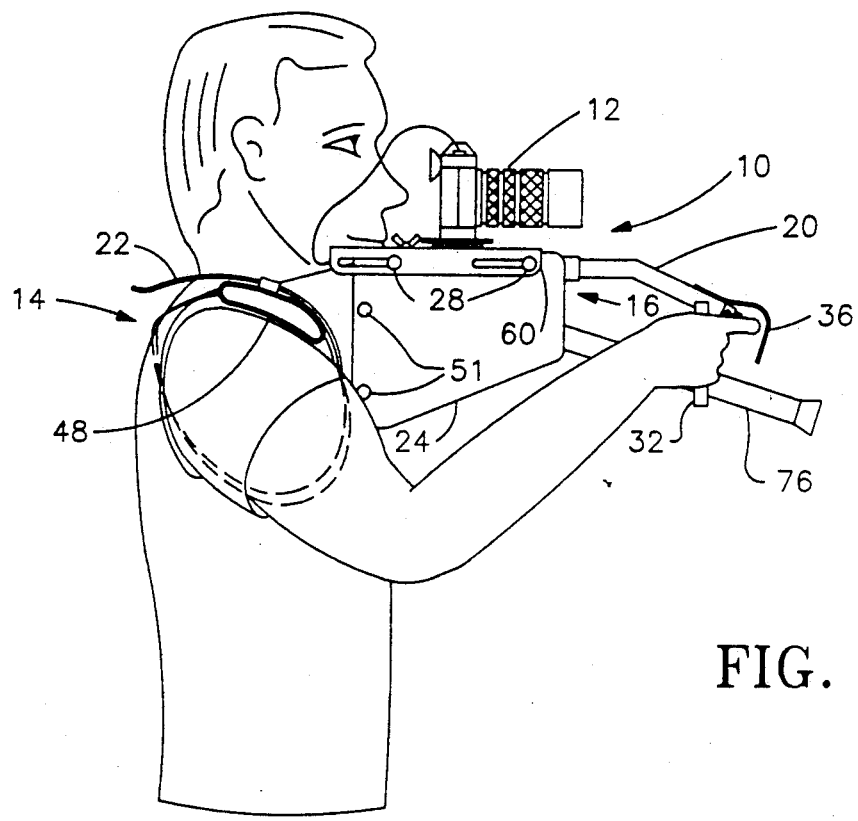
FIG. 2 is a side view of the camera support as shown in FIG. 1 with the camera support raised to the pointing ready to use position.

A hand grip 32 depends from proximate the distal end of portion 20 and a trigger release 34 protected by a trigger guard 36 is located at the distal end of portion 20. Trigger release 34 includes a spring loaded trigger and a cable 38 which attaches to the camera and functions in a standard manner such that camera 10 can be actuated by depressing the trigger release. Cable 38 has sufficient length such that it will not inhibit the pivoting of camera 12 from the position seen in FIG. 2 wherein the camera base is generally parallel to camera deck 26 to a perpendicular position (best seen in FIG. 3) wherein the camera base is generally perpendicular to camera deck 26. It has been found that the angle of the bend in portion 20 may vary but must be sufficient to keep the distal end along with trigger guard 36 from appearing in any pictures taken by camera 12.

Shoulder engaging portion 22 includes an arcuate portion 40 shaped to comfortably receive a user's shoulder. Shoulder engaging portion 22 includes recurved end portions 42 and 44 and integrally formed strap guides 46. A shoulder pad 48 of the strap arrangement 14 includes a guide strap 50 and is positioned on the shoulder engaging portion 22 such that it can freely shift relative thereto, the reasons for which will be discussed later. Shoulder engaging portion 22 is adjustably attached to side plate 24 by fasteners 51 cooperating with slots 52.

Strap arrangement 14 includes shoulder pad 48, shoulder strap 54, and chest strap 56. Shoulder pad 48 is attached to shoulder strap 54 and chest strap 56 is attached to shoulder pad 48. Both shoulder strap 54 and chest strap 56 are adjustable in length by any of the common means employed for such a purpose and preferably VELCRO hook and loop type fasteners 58 are utilized because of the ease with which the strap arrangement 14 can be attached to and detached from the user. To attach strap arrangement 14 to the user, shoulder strap 54, along with shoulder pad 48, is looped over the shoulder and secured and chest strap 56 is extended around the user's chest and secured. Once the shoulder strap 54 and the chest strap 56 are secured, the strap arrangement 14, along with shoulder pad 48, is substantially fixed relative to the user. It should be noted that, when camera support 10 is shifted from the suspended at-rest position to the pointing ready to use position, binding in the strap arrangement 14 and snagging in the user's clothing are avoided because of strap guides 46, guide strap 50, and recurved ends 42 and 44. Strap guides 46 permit the fixed shoulder strap 54 to slide therethrough, shoulder engaging portion 22 slides through guide strap 50 of pad 48, and recurved ends 42 and 44 are designed to ride up over folds in the user's clothes.

Figure 5:
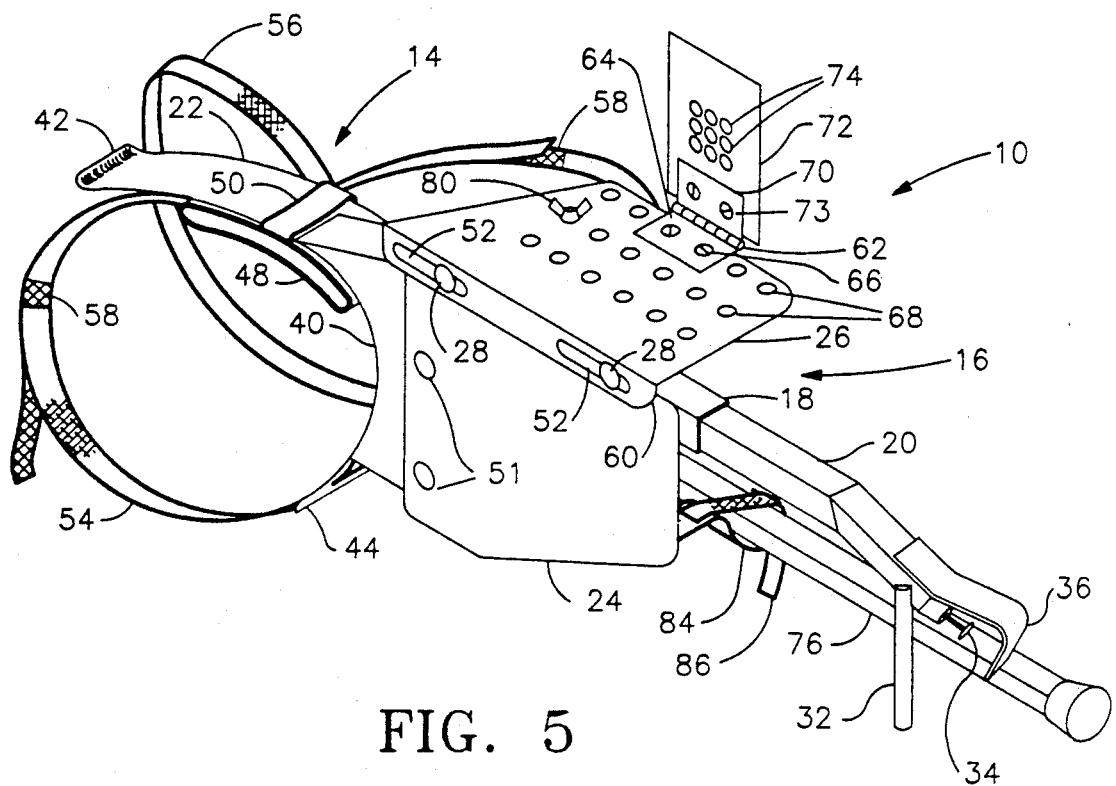
FIG. 5 is an isometric view of the camera support.

Referring now to FIG. 5, camera deck 26 includes a downwardly folded flange 60 in which slots 52 are formed. Camera deck 26 is disposed so that it extends substantially perpendicularly relative to side plate 24 and is adjustably secured relative thereto by fasteners 28. Camera deck 26 has a hinge 62 associated with an edge opposite from the edge having folded flange 60. A first leg 64 of hinge 62 is attached to camera deck 26 by fasteners 66 cooperating with selected apertures of a plurality of spaced apertures 68 and a second leg 70 of hinge 62 is attached to the base of camera 12. Hinge 62 includes a resilient positioning detent (not shown) for maintaining legs 64 and 70 in predetermined positions, one of which has the legs at substantially 90 degrees relative to one another, wherein the base of camera 12 can be positioned juxtaposed camera deck 26 or camera 12 can be pivoted about hinge 62 such that the camera base is disposed generally perpendicular relative to camera deck 26.

Fasteners 66 cooperate with spaced apertures 68 provided in camera deck 28 such that hinge 62 with camera 12 attached thereto can be selectively positioned to accommodate the individual user's needs as well as in certain instances, which will be discussed later, accommodate and balance the arrangement. It is contemplated that the second leg 70 of hinge 62 can either have a plate 72 attached thereto by fasteners 73 with the plate having a plurality of spaced apertures 74 therein to provide for additional adjustment of camera 12 relative to the elongated frame 16 or that second leg 70 of hinge 62 may be made sufficiently large so as to be the equivalent of plate 72. In situations in which the user wants to use lenses that may have substantial weight and/or length, the adjustability of the camera support of the instant invention will permit the user to balance the camera support and camera and still find a comfortable positioning such that it will be able to be quickly used.

Camera support 10 may optionally include a unipod 76 (FIG. 3) or a tripod 78 (FIG. 4) which may be attached to camera deck 26 by a suitable fastener such as a wing nut 80. Unipod 76 and tripod 78 includes a common pivot arrangement 82 which is preferably disposed such that the unipod and the tripod can pivot generally in a plane parallel to the longitudinal extension of elongated frame 16 thereby permitting the unipod or tripod to be stored in a position extending generally in the direction of the extension of the distal end of portion 20.

Figure 3:
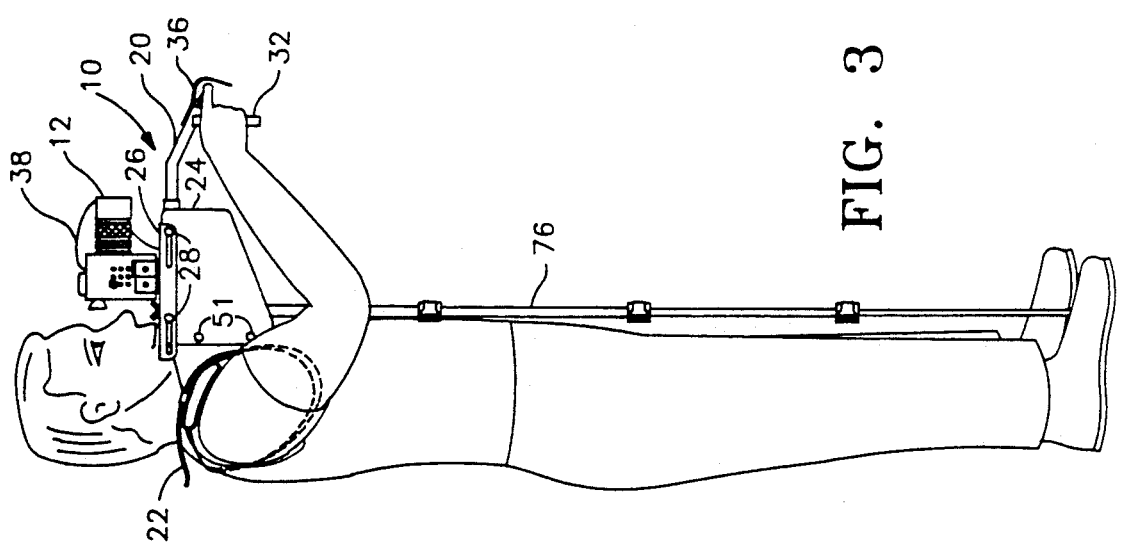
FIG. 3 shows the camera support of FIG. 2 with the camera rotated 90 degrees relative to the camera support and the unipod extended downwardly into engagement with the ground for added stabilization of the camera.

As best seen in FIG. 5, unipod 76 is supported in a stored condition by a hanger 84 which is attached to side plate 24. Hanger 84 is positioned as high as possible on side plate 24 such that the free end of the unipod or tripod will not appear in any pictures taken by camera 12. A safety strap 86 attached to hanger 84 secures the unipod or tripod in the hanger while camera support 12 is transported and/or shifted. Strap 86 is preferably secured to hanger 84 by hook and loop type fasteners commonly referred to as VELCRO. As best seen in FIG. 3, when camera support 10 is attached to the user by strap arrangement 14 and it is determined that additional stability is needed, unipod 76 can be quickly and easily released from its stored position on hanger 84 by release of safety strap 86 and extended downwardly into engagement with the ground. Alternatively, tripod 78 may be used in place of unipod 76 wherein camera support 10 will have additional capabilities as will be discussed later. Unipod 76 or tripod 78, when in the stored position, adds a stabilizing influence as the camera support is moved from the suspended at-rest position to the pointing ready to use position due to its counter-balancing effect.

There may be situations when the user will want to utilize the camera and camera support without the camera support being attached to the body by the strap arrangement. Accordingly, when tripod 78 is utilized, the camera support can be detached from the user and the tripod set up to thereby permit the camera support, with the attached camera, to be positioned and utilized in a conventional manner (see FIG. 4). The unique combination of adjustabilities provided by the camera support will permit the user to balance the camera support relative to the tripod for free standing usage.

In use, the individual user will attach the camera support to their upper body by first fastening shoulder strap 54 and shoulder pad 48 in place and then securing chest strap 56. A determination of the best location for camera 12 relative to camera support 10 is then made such that the camera can be comfortably utilized in an expedient manner. Accordingly, camera 12 is attached to the second leg 70 of hinge 62 and first leg 64 of hinge 62 is adjusted relative to the camera deck 26. Camera deck 26 is then positioned such that the camera is comfortably located relative to the user when the camera support is in the pointing ready to use position. Once camera 12 is comfortably positioned then second portion 20 of elongated frame 16 is telescoped relative to first portion 18 and secured in position such that hand grip 32 is at a comfortable distance. The camera support 10, when properly adjusted, is free to depend in the at-rest position and is ready to be quickly moved from the at-rest position to the pointing ready to use position wherein the camera can be actuated by the trigger release mechanism. When greater stability is needed the user can employ a unipod or tripod. The unipod or tripod is easily released from the hanger and extended into engagement with the ground. To use the camera support in a free standing manner with the tripod simply requires the release of the strap arrangement and the balancing of the camera and camera support using the unique arrangement of adjustabilities on the camera support.

Figure 1:
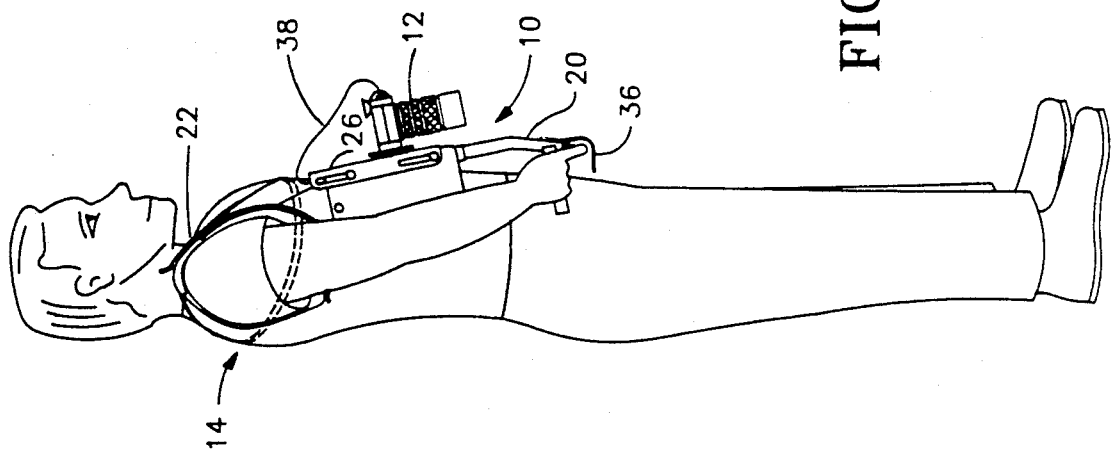
FIG. 1 is a side view of the camera support of the instant invention attached to the upper body of a user by a strap arrangement and shown suspended in the at-rest position.

The advantages of the instant invention include that it can be used in any number of situations, most important of which is that it can be brought into action almost instantaneously after a period of non-usage (see FIGS. 1 and 3 wherein the camera support 10 is shown suspended in the at-rest position and raised to the pointing ready to use position, respectively). It should be noted that the camera support, including the elongated frame, may be fabricated of any suitable materials and preferably is made of the lightest materials which are most economically feasible.

Various modifications and changes are contemplated without departing from the spirit and scope of the invention as hereinafter defined by the appended claims.

I claim:

1. A camera support comprising an elongated frame having a shoulder engaging portion at one end and a hand grip at a distal end, means for attaching a camera disposed on said elongated frame between said shoulder engaging portion and said distal end, strap means for securing the elongated frame relative to a user's shoulder while permitting movement of the elongated frame between a suspended at-rest position and a pointing ready to use position, and extendible means attached to said elongated frame, said means for attaching a camera including hinge means for permitting pivotal movement of the camera wherein the camera can be pivoted about said hinge means to be selectively positioned relative to said elongated frame and said extendible means being movable from a stored position to a ground engaging supporting position when said elongated frame is in the pointing position, said extendible means including a tripod with extendible legs, said tripod being pivotally attached to said elongated frame, and releaseable strap means cooperating with a hanger on said elongated frame for securing and supporting the tripod in the stored position.

2. A camera support as set forth in claim 1 wherein said strap means includes a shoulder strap, a shoulder pad, and a chest strap.

3. A camera support comprising an elongated frame having a shoulder engaging portion at one end and a hand grip at a distal end, means for attaching a camera disposed on said elongated frame between said shoulder engaging portion and said distal end, strap means for securing the elongated frame relative to a user's shoulder while permitting movement of the elongated frame between a suspended at-rest position and a pointing ready to use position, and extendible means attached to said elongated frame, said means for attaching a camera including hinge means for permitting pivotal movement of the camera wherein the camera can be pivoted about said hinge means to be selectively positioned relative to said elongated frame and said extendible means being movable from a stored position to a a ground engaging supporting position when said elongated frame is in the pointing position, said extendible means including a unipod with an extendible leg, said unipod being pivotally attached to said elongated frame, and releasable strap means cooperating with a hanger on said elongated frame for securing and supporting the unipod in the stored position.

4. A camera support comprising an elongated frame having a shoulder engaging portion at one end and a hand grip at a distal end, means for attaching a camera disposed on said elongated frame between said shoulder engaging portion and said distal end, and strap means for securing the elongated frame relative to a user's shoulder while permitting movement of the elongated frame between a suspended at-rest position and a pointing ready to use position, said means for attaching a camera including hinge means for permitting pivotal movement of the camera wherein the camera can be pivoted about said hinge means to be selectively positioned relative to said elongated frame, said hinge means including a leg having apertures for receiving fasteners, said means for attaching including a camera deck permitting adjustable positioning of the hinge means relative thereto, and fasteners for securing the hinge means to the camera deck whereby the position of the camera relative to the elongated frame is adjustable.

5. A camera support as set forth in claim 4 wherein said camera deck includes a plurality of apertures spaced to accommodate positioning of a camera in a position most comfortable for a user.

6. A camera support as set forth in claim 5 wherein said camera deck includes means for permitting adjustment of the camera deck relative the elongated frame, wherein said last named means and the plurality of apertures cooperate to permit adjustment of the camera relative to the elongated frame to thereby accommodate various sizes and shapes of cameras and thereby improve positioning of the camera relative to the camera support and balance of the camera support.

7. A camera support as set forth in claim 4 wherein plate means is disposed between said camera and said hinge means, and means for adjustable fastening of the plate means to the hinge means such that additional adjustment is provided for the positioning of the camera.

8. A camera support comprising an elongated frame having a shoulder engaging portion at one end and a hand grip at a distal end, means for attaching a camera disposed on said elongated frame between said shoulder engaging portion and said distal end, and strap means for securing the elongated frame relative to a user's shoulder while permitting movement of the elongated frame between a suspended at-rest position and a pointing ready to use position, said means for attaching a camera including hinge means for permitting pivotal movement of the camera wherein the camera can be pivoted about said hinge means to be selectively positioned relative to said elongated frame, said elongated frame including a first portion and a telescoping second portion, said hand grip being disposed at a distal end of said telescoping second portion, and means for securing the telescoping second portion relative to said first portion.

9. A camera support as set forth in claim 8 wherein said means for securing includes a resilient detent.

10. A camera support as set forth in claim 9 wherein said first portion and said telescoping second portion are formed of square tube.

11. A camera support as set forth in claim 7 wherein said plate means is formed as part of said hinge means and said hinge means includes a plurality of apertures in spaced apart rows for receiving fasteners.

12. A camera support comprising an elongated frame having a shoulder engaging portion at one end and a hand grip at a distal end, means for attaching a camera disposed on said elongated frame between said shoulder engaging portion and said distal end, and strap means for securing the elongated frame relative to a user's shoulder while permitting movement of the elongated frame between a suspended at-rest position and a pointing ready to use position, said means for attaching a camera including hinge means for permitting pivotal movement of the camera wherein the camera can be pivoted about said hinge means to be selectively positioned relative to said elongated frame, said strap means including a shoulder strap and a shoulder pad having a guide strap, said shoulder engaging portion including an arcuate portion and recurved ends, said arcuate portion having a predetermined curvature and a predetermined length, said shoulder pad being secured to said shoulder engaging portion between the recurved ends, said strap means being generally fixed relative to the user while the shoulder engaging portion is free to slide relative to the pad during movement of the camera support between the suspended and pointing positions.

13. A camera support as set forth in claim 12 wherein said strap means including a chest strap extending around the users chest to secure the position of the shoulder pad relative to the shoulder and said shoulder engaging portion includes strap guides for said shoulder strap.

14. A camera support comprising an elongated frame having a shoulder engaging portion at one end and a hand grip at a distal end, means for attaching a camera disposed on said elongated frame between said shoulder engaging portion and said distal end, strap means for securing the elongated frame relative to a user's shoulder while permitting movement of the elongated frame between a suspended at-rest position and a pointing ready to use position, and extendible means attached to said elongated frame, said means for attaching a camera including means hinge means for permitting pivotal movement of the camera wherein the camera can be pivoted about said hinge means to be selectively positioned relative to said elongated frame and said extendible means being movable from a stored position to a ground engaging supporting position when said elongated frame is in the pointing position, said elongated frame including a first portion and a telescoping second portion, said hand grip being disposed at a distal end of said telescoping second portion, and means for securing the telescoping second portion relative to said first portion.

15. A camera support as set forth in claim 14 wherein said strap means includes a shoulder strap and a shoulder pad having a strap guide, said shoulder engaging portion including an arcuate portion and recurved ends, said arcuate portion having a predetermined curvature and a predetermined length, said shoulder pad being secured to said shoulder engaging portion between the recurved ends, said strap means being generally fixed relative to the user while the shoulder engaging portion is free to slide relative to the pad during movement of the camera support between the suspended and pointing positions, said strap means including a chest strap extending around the users chest to secure the position of the shoulder pad relative to the shoulder.

16. A camera support as set forth in claim 15 wherein said shoulder engaging portion includes strap guides for said shoulder strap.

17. A camera support as set forth in claim 16 wherein said elongated frame includes a hanger for supporting said extendible means in the stored position and a releasable safety strap cooperating with said hanger for securing the extendible means relative to the hanger.

18. A camera support as set forth in claim 17 wherein a trigger release is disposed at the distal end of said elongated frame, a cable connects the trigger release and the camera whereby the camera can be actuated by said trigger release.

* * * * *